(12) United States Patent  
Honma et al.

(10) Patent No.: US 10,095,204 B2
(45) Date of Patent: Oct. 9, 2018

(54) METHOD, MEDIUM, AND SYSTEM

(71) Applicant: FUJITSU LIMITED, Kawasaki-shi, Kanagawa (JP)

(72) Inventors: Tsuyoshi Honma, Nagoya (JP); Tamotsu Sengoku, Kasugai (JP); Tokutomi Nagao, Tsushima (JP); Naoaki Ono, Nagoya (JP); Seiji Kambe, Gifu (JP); Yuuji Itou, Kasugai (JP); Haruki Hattori, Inazawa (JP)

(73) Assignee: FUJITSU LIMITED, Kawasaki (JP)

( * ) Notice: Subject to any disclaimer, the term of this patent is extended or adjusted under 35 U.S.C. 154(b) by 474 days.

(21) Appl. No.: 14/974,365

(22) Filed: Dec. 18, 2015

(65) Prior Publication Data
US 2016/0187018 A1 Jun. 30, 2016

(30) Foreign Application Priority Data

Dec. 26, 2014 (JP) ................................ 2014-265796

(51) Int. Cl.
F24F 11/30 (2018.01)
G05B 15/02 (2006.01)
G06F 1/20 (2006.01)
G06F 9/50 (2006.01)
F24F 110/10 (2018.01)

(52) U.S. Cl.
CPC ............ G05B 15/02 (2013.01); G06F 1/206 (2013.01); G06F 9/5094 (2013.01); F24F 11/30 (2018.01); F24F 2110/10 (2018.01); Y02D 10/16 (2018.01)

(58) Field of Classification Search
CPC ........ G05B 15/02; G06F 1/206; G06F 9/5094
See application file for complete search history.

(56) References Cited

U.S. PATENT DOCUMENTS 7,461,273 B2 * 12/2008 Moore .................... G06F 1/206
713/300
9,135,063 B1 * 9/2015 Ghose ................... G06F 1/3206
(Continued)

FOREIGN PATENT DOCUMENTS

JP 2006-133995 5/2006
JP 2008-242614 10/2008
(Continued)

Primary Examiner — Evan Pert
(74) Attorney, Agent, or Firm — Oblon, McClelland, Maier & Neustadt, L.L.P.

(57) ABSTRACT

A method includes: generating first information for each of a plurality of jobs based on temperature information acquired from a first information processing device that has executed each of the plurality of jobs, each of the first information indicating change amount of the temperature of the first information processing device when each of the jobs is executed by the first information processing device; generating second information for each of a plurality of second information processing devices that have executed a specific one of the plurality of jobs, the second information indicating change amount of the temperature of each of the second information processing devices which executed the specific job; and determining which one of the plurality of second information processing devices to allocate a job based on the first information, the second information and the temperature information of the plurality of second information processing devices.

20 Claims, 34 Drawing Sheets

(56) References Cited

U.S. PATENT DOCUMENTS

| | | | |
|---|---|---|---|
| 9,152,472 B2* | 10/2015 | Kazama | G06F 9/5094 |
| 2005/0278520 A1 | 12/2005 | Hirai et al. | |
| 2006/0095911 A1 | 5/2006 | Uemura et al. | |

FOREIGN PATENT DOCUMENTS

| | | |
|---|---|---|
| JP | 2010-108324 | 5/2010 |
| WO | WO 03/083693 A1 | 10/2003 |

* cited by examiner

FIG. 5

| JOB NET | JOB | BATCH FILE |
|---------|------|------------|
| netA | jobA | test1.bat |
| netA | jobB | test2.bat |
| netB | jobC | test3.bat |
| netB | jobD | test4.bat |
| ⋮ | ⋮ | ⋮ |

FIG. 7A

| TIME (SECOND) | 1 | 2 | 3 | ... | 86400 |
|---|---|---|---|---|---|
| CPU TEMPERATURE (°C) | 26.2 | 26.2 | 26.2 | ... | 27.0 |

FIG. 7B

| TIME (SECOND) | 1 | 2 | 3 | ... | 86400 |
|---|---|---|---|---|---|
| CPU TEMPERATURE (°C) | 26.2 | 26.2 | 26.2 | ... | 28.02 |

FIG. 8

| JOB | START | START |
|---|---|---|
| jobA | 10:51:00 | 10:51:10 |
| jobB | 10:51:00 | 10:51:20 |
| jobC | 10:51:00 | 10:51:30 |
| jobD | 10:51:30 | 10:51:40 |
| ⋮ | ⋮ | ⋮ |

FIG. 10

| JOB NET | JOB | CPU TEMPERATURE RISE |
|---|---|---|
| netA | jobA | 0.06 |
| netA | jobB | 0.03 |
| netB | jobC | 0.08 |
| netB | jobD | 0.04 |
| ⋮ | ⋮ | ⋮ |

FIG. 12

| JOB NET | JOB | HDD TEMPERATURE RISE |
|---------|------|------|
| netA | jobA | 0.046 |
| netA | jobB | 0.055 |
| netB | jobC | 0.066 |
| netB | jobD | 0.077 |
| ⋮ | ⋮ | ⋮ |

FIG. 13

| JOB NET | JOB | CPU TEMPERATURE RISE | HDD TEMPERATURE RISE | TEMPERATURE RISE BY JOB | TEMPERATURE RISE BY JOB NET |
|---|---|---|---|---|---|
| netA | jobA | 0.06 | 0.046 | 0.04 | 0.09 |
| | jobB | 0.03 | 0.055 | 0.05 | |
| netB | jobC | 0.08 | 0.066 | 0.06 | 0.14 |
| | jobD | 0.04 | 0.077 | 0.08 | |
| ... | ... | ... | ... | ... | ... |

FIG. 15

| JOB NET | TEMPERATURE RISE BY JOB NET |
|---|---|
| netZ | 2.00 |
| netY | 1.98 |
| netX | 1.97 |
| ⋮ | ⋮ |
| netA | 0.19 |

FIG. 16

| EXECUTION SERVER | TEMPERATURE RISE BY REFERENCE JOB NET |
|---|---|
| svD | 0.01 |
| svE | 0.01 |
| svC | 0.02 |
| ⋮ | ⋮ |
| svP | 0.30 |

FIG. 18

| EXECUTION SERVER | SERVER TEMPERATURE (°C) |
|---|---|
| svA | 25.0 |
| svB | 24.0 |
| svC | 23.0 |
| ⋮ | ⋮ |
| svP | 28.0 |

FIG. 19

| EXECUTION SERVER | SERVER TEMPERATURE (°C) | TEMPERATURE RISE BY REFERENCE JOB NET (°C) |
|---|---|---|
| svD | 22.0 | 0.01 |
| svE | 22.0 | 0.01 |
| svC | 23.0 | 0.02 |
| ⋮ | ⋮ | ⋮ |
| svP | 28.0 | 0.30 |

FIG. 20

| EXECUTION SERVER | SERVER TEMPERATURE (°C) | TEMPERATURE RISE BY REFERENCE JOB NET (°C) |
|---|---|---|
| svD | 0.01 | 22.0 |
| svE | 0.01 | 22.0 |
| svC | 0.02 | 22.0 |
| ⋮ | ⋮ | ⋮ |
| svP | 0.30 | 28.0 |

FIG. 21

| EXECUTION SERVER | TEMPERATURE RISE BY REFERENCE JOB NET (°C) | PREDICTED VALUE (°C) |
|---|---|---|
| svD | 0.010 | 22.19(=22.00+0.19) |
| svE | 0.010 | 22 |
| svC | 0.020 | 22 |
| svF | 0.020 | 23 |
| ⋮ | ⋮ | ⋮ |
| svP | 0.300 | 28 |

FIG. 22

| EXECUTION SERVER | TEMPERATURE RISE BY REFERENCE JOB NET (°C) | PREDICTED VALUE (°C) |
|---|---|---|
| svE | 0.01 | 22 |
| svC | 0.02 | 22 |
| svD | 0.01 | 22.19 |
| svF | 0.02 | 23 |
| ⋮ | ⋮ | ⋮ |
| svP | 0.30 | 28 |

FIG. 23

| EXECUTION SERVER | TEMPERATURE RISE BY REFERENCE JOB NET (°C) | PREDICTED VALUE (°C) | MEASURED VALUE (°C) |
|---|---|---|---|
| svC | 0.020 | 26.00 | 28.00 |
| svE | 0.010 | 26.01 | 27.03 |
| svD | 0.010 | 26.02 | 26.04 |
| svF | 0.020 | 26.03 | 29.03 |
| svK | 0.010 | 26.04 | 27.03 |
| ⋮ | ⋮ | ⋮ | ⋮ |
| svP | 0.300 | 26.20 | 25.20 |
| svI | 0.300 | 26.21 | 26.41 |

FIG. 25

| EXECUTION SERVER | TEMPERATURE RISE BY REFERENCE JOB NET (°C) | PREDICTED VALUE (°C) | MEASURED VALUE (°C) | DIFFERENCE (°C) |
|---|---|---|---|---|
| svC | 0.020 | 26.00 | 28.00 | 2.00 |
| svE | 0.010 | 26.01 | 27.03 | 1.02 |
| svD | 0.010 | 26.02 | 26.04 | 0.02 |
| svF | 0.020 | 26.03 | 29.03 | 3.00 |
| svK | 0.010 | 26.04 | 27.03 | 0.99 |
| ⋮ | ⋮ | ⋮ | ⋮ | ⋮ |
| svP | 0.300 | 26.20 | 25.20 | −1.00 |
| svI | 0.300 | 26.21 | 26.41 | 0.20 |

FIG. 26

| EXECUTION SERVER | TEMPERATURE RISE BY REFERENCE JOB NET (°C) | PREDICTED VALUE (°C) | MEASURED VALUE (°C) | DIFFERENCE (°C) |
|---|---|---|---|---|
| svF | 0.020 | 26.03 | 29.03 | 3.00 |
| svC | 0.020 | 26.00 | 28.00 | 2.00 |
| svE | 0.010 | 26.01 | 27.03 | 1.02 |
| svK | 0.010 | 26.04 | 27.03 | 0.99 |
| ⋮ | ⋮ | ⋮ | ⋮ | ⋮ |
| svI | 0.300 | 26.21 | 26.41 | 0.20 |
| svD | 0.010 | 26.02 | 26.04 | 0.02 |
| svP | 0.300 | 26.20 | 25.20 | -1.00 |

FIG. 29

| EXECUTION SERVER | JOB NET TO BE EXECUTED | JOB NET NOT TO BE EXECUTED |
|---|---|---|
| svM |  | netK |
| svN | netK |  |

FIG. 30

| EXECUTION SERVER | TEMPERATURE RISE BY REFERENCE JOB NET (°C) | PREDICTED VALUE (°C) | MEASURED VALUE (°C) | DIFFERENCE (°C) |
| --- | --- | --- | --- | --- |
| svF | 0.020 | 27.53 | 27.03 | 0.50 |
| svC | 0.020 | 27.48 | 27.00 | 0.48 |
| svE | 0.010 | 26.67 | 27.03 | 0.36 |
| svP | 0.300 | 26.50 | 26.20 | 0.30 |
| svK | 0.010 | 26.75 | 27.03 | 0.28 |
| ⋮ | ⋮ | ⋮ | ⋮ | ⋮ |
| svI | 0.300 | 26.31 | 26.41 | 0.10 |
| svD | 0.010 | 27.02 | 27.04 | 0.02 |

FIG. 31

| JOB NET | JOB | TIME (SECOND) | 1 | 2 | 3 | ... | 86400 |
|---|---|---|---|---|---|---|---|
| netA | jobA | CPU USE RATE | 30% | 30% | 30% | ... | |
| netA | jobB | | 20% | 20% | 20% | ... | |
| netB | jobC | | 10% | 10% | 10% | ... | |
| netB | jobD | | 5% | 5% | 5% | ... | |
| ⋮ | ⋮ | ⋮ | ⋮ | ⋮ | ⋮ | | |

FIG. 32

| JOB NET | JOB | TIME (SECOND) | | | | | | | | | | |
|---|---|---|---|---|---|---|---|---|---|---|---|---|
| | | 1 | | 2 | | 3 | | ... | | 86400 | |
| | | R | W | R | W | R | W | | | R | W |
| netA | jobA | 15 | 15 | 15 | 15 | 15 | 15 | ... | ... | 0 | 0 |
| netA | jobB | 30 | 30 | 30 | 30 | 30 | 30 | ... | ... | 0 | 0 |
| netB | jobC | 45 | 45 | 45 | 45 | 45 | 45 | ... | ... | 0 | 0 |
| netB | jobD | 0 | 0 | 0 | 0 | 0 | 0 | ... | ... | 1 | 1 |
| ... | ... | | | | | | | ... | ... | | |
| | IO USE RATE | | | | | | | | | | |
| | TOTAL R/W (BYTE) | 100 | 100 | 90 | 90 | 80 | 80 | ... | ... | 50 | 50 |

METHOD, MEDIUM, AND SYSTEM

CROSS-REFERENCE TO RELATED APPLICATION

This application is based upon and claims the benefit of priority of the prior Japanese Patent Application No. 2014-265796, filed on Dec. 26, 2014, the entire contents of which are incorporated herein by reference.

FIELD

The embodiments discussed herein are related to a job allocation technique.

BACKGROUND

Due to high densification, high performance and other factors of servers, an amount of power consumed in a data center has been increasing, and the increase of the power consumption has led to an increase in heat generation. Temperature rise due to an increase in heat generation causes a thermal runaway or a failure of the server. This makes it difficult to operate the data center stably, and brings about adverse effects such as reduction of the service life of the server.

To solve the above problems, the air conditioner is provided in a place such as a server room where servers are arranged. However, high temperature air may stagnate in an area not easily reachable by a flow of air generated by the air conditioner (such an area is hereinafter referred to as a hot spot). This phenomenon is described with reference to FIG. 1. In the example of FIG. 1, servers A to P and an air conditioner are installed in a server room. The air conditioner lowers the temperature in the server room by sending air. The servers A to P execute jobs.

Since the servers A to H arranged in a location relatively close to the air conditioner are cooled by a strong air flow sent from the air conditioner, the hot spot hardly occurs around the servers A to H. However, the servers I to P arranged in a location relatively far from the air conditioner are hardly cooled since the wind sent from the air conditioner is weak. In the farthest location from the air conditioner, in particular, within the surroundings of the servers I to P, a hot spot is likely to occur because the air from the air conditioner is not easily reachable.

In this way, how easily the temperature rises varies among places where servers are installed. Also, how easily the temperature rises varies due to a difference in the processing load of resident basic software and so on. Since a temperature rise poses various problems as described above, jobs are preferably allocated so that a local temperature rise will not occur. However, even if a temperature rise is detected after the execution of a job is started, it is ill-advised to terminate the job easily, because the terminating of the ongoing job wastes an already executed portion of the job.

There is a technique of allocating tasks and the like based on temperature information. For example, a document discloses a technique that measures the temperature of each of multiple processors, and allocates tasks to the multiple processors based on the measured temperatures.

However, even a method of allocating tasks to processors currently at low temperature, for example, may cause a significant temperature rise, if a task of a high processing load is allocated to a processor in which the temperature tends to rise easily.

As an example of prior arts, there are known International Publication Pamphlet No. 2003/083693, Japanese Laid-open Patent Publication No. 2006-133995, Japanese Laid-open Patent Publication No. 2008-242614, and Japanese Laid-open Patent Publication No. 2010-108324.

SUMMARY

According to an aspect of the invention, a method includes: generating first information for each of a plurality of jobs based on temperature information acquired from a first information processing device that has executed each of the plurality of jobs, each of the first information indicating change amount of the temperature of the first information processing device when each corresponding job is executed by the first information processing device; generating second information for each of a plurality of second information processing devices that have executed a specific one of the plurality of jobs, based on temperature information acquired from each of the second information processing devices, the second information indicating change amount of the temperature of each of the second information processing devices when the specific job is executed by each of the second information processing devices; and determining which one of the plurality of second information processing devices to allocate at least one of the plurality of jobs, based on the temperature information of the plurality of second information processing devices, the first information for the plurality of jobs, and the second information for the plurality of second information processing devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of job net data stored in a first data storage section;

FIG. 7A illustrates an example of time series data of CPU temperature;

FIG. 7B illustrates an example of time series data of HDD temperature;

FIG. 8 illustrates an example of execution result data;

FIG. 10 illustrates an example of first CPU data;

FIG. 12 illustrates an example of first HDD data;

FIG. 13 illustrates an example of first temperature data;

FIG. 15 illustrates an example of second temperature data;

FIG. 16 illustrates an example of first server data;

FIG. 18 illustrates an example of data of server temperature stored in a third data storage section;

FIG. 19 illustrates an example of second server data;

FIG. 20 illustrates an example of third server data;

FIG. 21 illustrates an example of third server data;

FIG. 22 illustrates an example of third server data;

FIG. 23 illustrates an example of fourth server data;

FIG. 25 illustrates an example of fifth server data;

FIG. 26 illustrates an example of fifth server data;

FIG. 29 illustrates an example of designated data;

FIG. 30 illustrates an example of fifth server data;

FIG. 31 illustrates an example of time series data of CPU use rate;

FIG. 32 illustrates an example of time series data of IO use rate;

DESCRIPTION OF EMBODIMENTS

According to one aspect, it is an object of embodiments to provide a technique for appropriately allocating a job based on a server temperature.

First Embodiment

Figure 1:
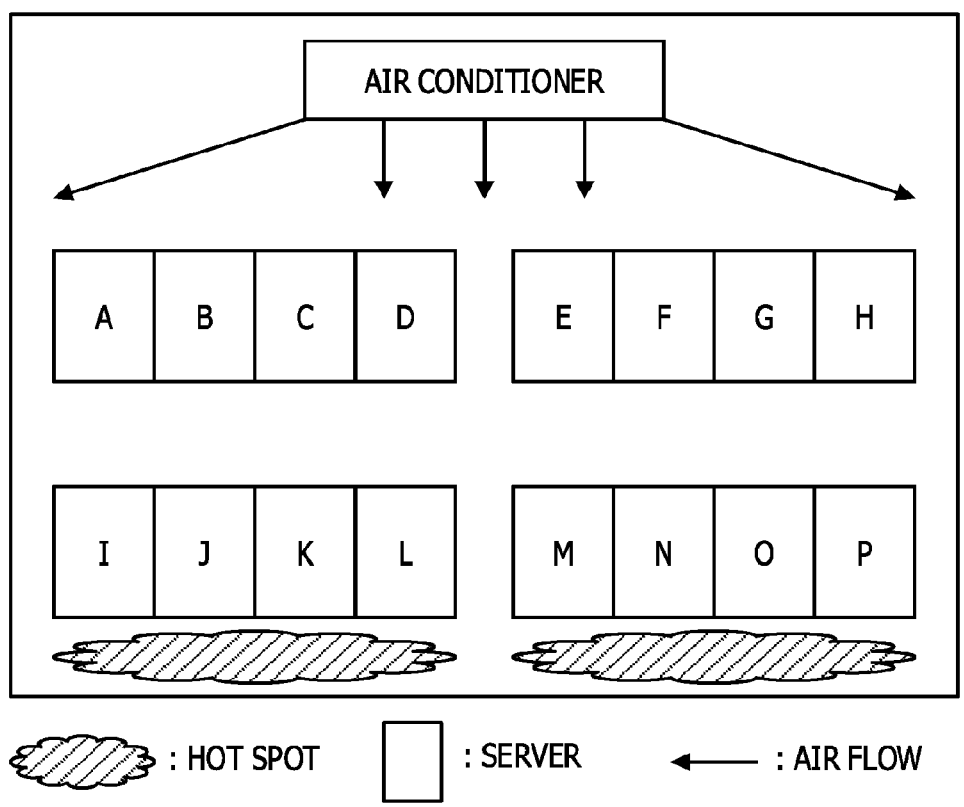
FIG. 1 is a diagram for illustrating the occurrence of a hot spot.
Figure 2:
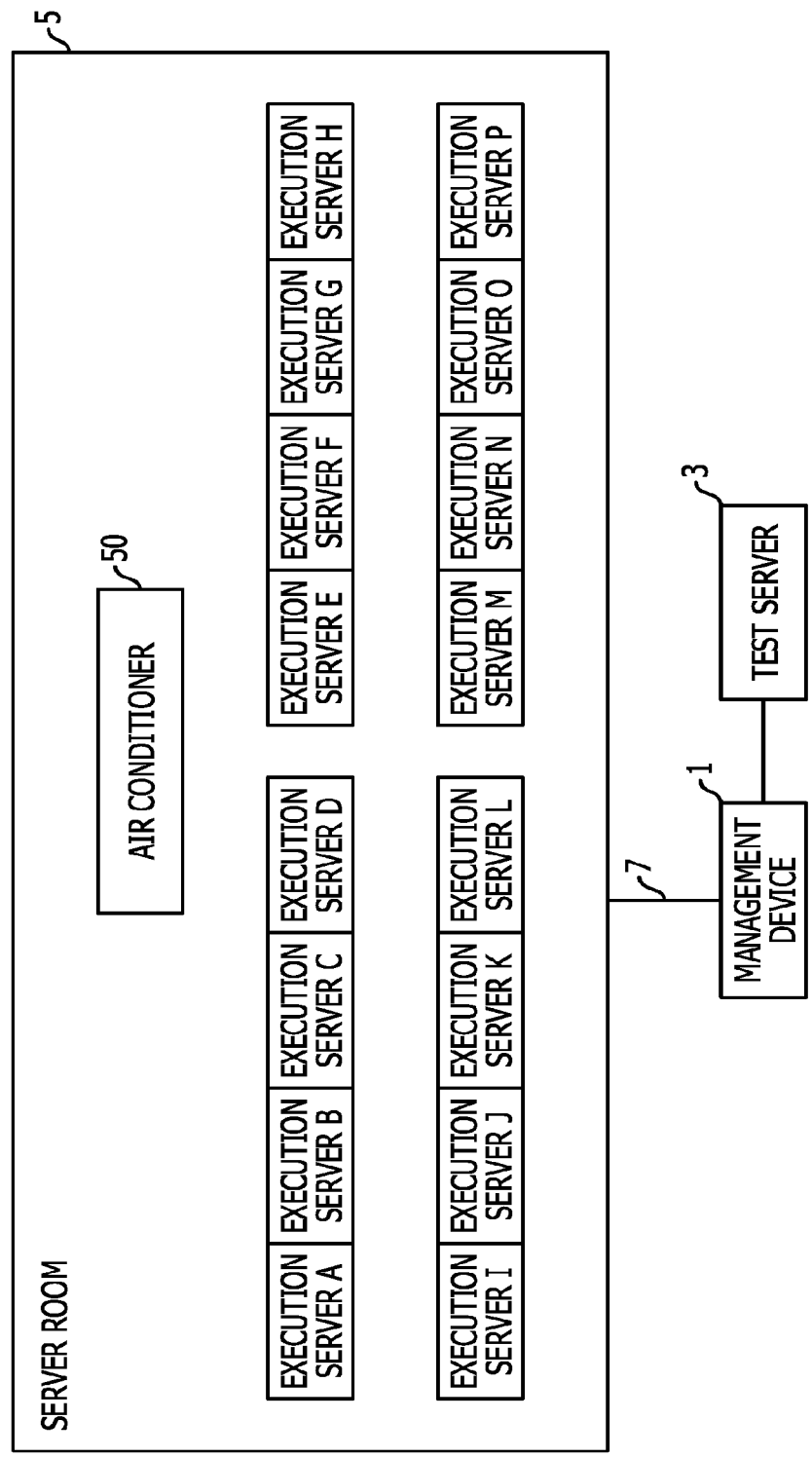
FIG. 2 illustrates a schematic view of a system according to an embodiment.

FIG. 2 illustrates a schematic view of a system according to an embodiment. A server room 5, for example, in a data center is provided with the execution servers A to P configured to execute a job, and an air conditioner 50 configured to send air to cool down the server room 5. The execution servers A to P are coupled to a management device 1 configured to manage the execution of a job by the execution servers A to P and a job by a test server 3 via a network 7 which is, for example, a local area network (LAN). However, wirings between the management device 1 and the execution servers A to P are not illustrated for simplicity. The management device 1 is coupled to the test server 3 configured to execute a job, via the network 7. Although the management device 1 illustrated in FIG. 2 is installed outside the server room 5, it may be installed in the server room 5.

Figure 3:
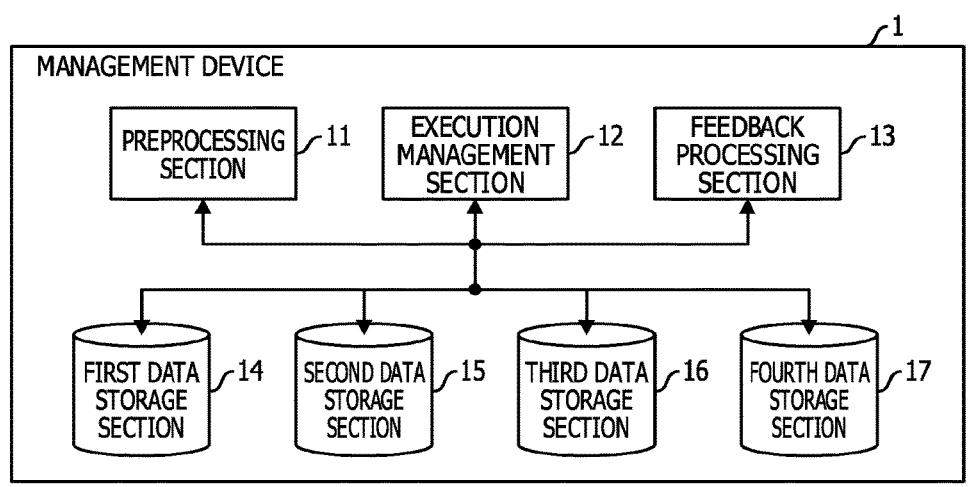
FIG. 3 is a functional block diagram of a management device.

FIG. 3 illustrates a functional block diagram of the management device 1. The management device 1 includes a preprocessing section 11, an execution management section 12, a feedback processing section 13, a first data storage section 14, a second data storage section 15, a third data storage section 16, and a fourth data storage section 17.

The preprocessing section 11 calculates a temperature rise (° C.) of the test server 3 for each of job nets based on the data stored in the first data storage section 14, and stores the calculation result into the second data storage section 15. Also, based on the data stored in the second data storage section 15, the preprocessing section 11 calculates, for each of execution servers, a temperature rise (° C.) by the execution of a job net (hereinafter referred to as the reference job net) selected based on a predetermined condition, and stores the calculation result into the second data storage section 15. The execution management section 12 executes such a processing of allocating a job to the execution servers A to P based on the data stored in the second data storage section 15, and stores the processing result into the third data storage section 16.

The feedback processing section 13 executes a processing based on the data stored in the third data storage section 16, and stores the processing result into the fourth data storage section 17.

Figure 4A:
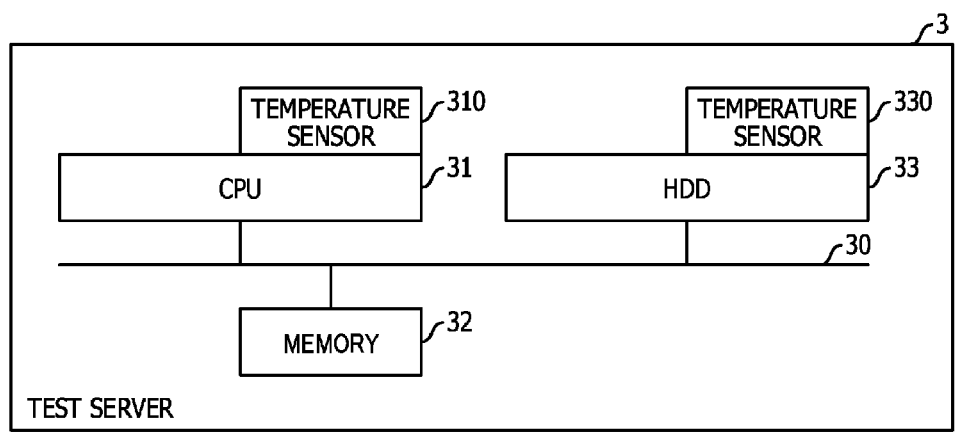
FIG. 4A illustrates a hardware configuration example of a test server.

FIG. 4A illustrates a hardware configuration example of the test server 3. The test server 3 includes a central processing unit (CPU) 31, a temperature sensor 310 attached to the CPU 31, a memory 32 which is, for example, a main memory, a hard disk drive (HDD) 33, and a temperature sensor 330 attached to the HDD 33. The CPU 31, the memory 32, and the HDD 33 are coupled to one another via a bus 30. The temperature sensor 310 is configured to measure a CPU temperature, and the temperature sensor 330 is configured to measure a HDD temperature. A hardware configuration of each of the execution servers A to P is the same as the hardware configuration of the test server 3.

Since temperature is different depending on the measurement place, a representative value representing the temperature (hereinafter referred to as the server temperature) of the test server 3 is defined. In this embodiment, the server temperature is calculated by $s=\alpha c+(1-\alpha)h$, where, s is the server temperature, c is the CPU temperature, and h is the HDD temperature. $\alpha$ is a real number satisfying $0<\alpha<1$ and predetermined by the administrator. However, the method of calculating the server temperature is not limited to the method described herein. Similarly, the execution servers A to P are not limited to the execution servers described herein.

Figure 4B:
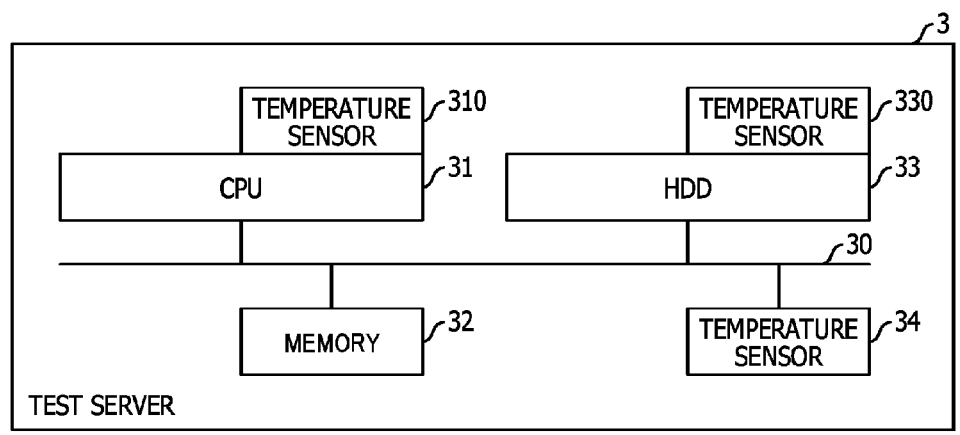
FIG. 4B illustrates a hardware configuration example of the test server.

As illustrated in FIG. 4B, a temperature sensor for measuring the server temperature is provided separately. The test server 3 illustrated in FIG. 4B includes a CPU 31, a temperature sensor 310 attached to the CPU 31, a memory 32, a HDD 33, a temperature sensor 330, and a temperature sensor 34 for measuring the server temperature. The CPU 31, the memory 32, the HDD 33, and the temperature sensor 34 are coupled to one another via the bus 30. However, the location where the temperature sensor 34 is installed is not limited to such a place as illustrated in FIG. 4B.

The hardware configuration of each of the execution servers A to P is the same as the hardware configuration of the test server 3.

FIG. 5 illustrates an example of job net data stored in the first data storage section 14. In the example of FIG. 5, a job net name, a job name, and a batch file name are stored. The job net is a group of multiple jobs executed in a predetermined order. For example, a job net "netA" includes a job "jobA" and a job "jobB". The first data storage section 14 also stores an execution schedule for preprocessing, and an actual execution schedule.

Next, processings executed by the management device 1 are described with reference to FIG. 6 to FIG. 30. First, a processing of calculating a temperature rise for each of job nets by the preprocessing section 11 of the management device 1 is described.

Figure 6:
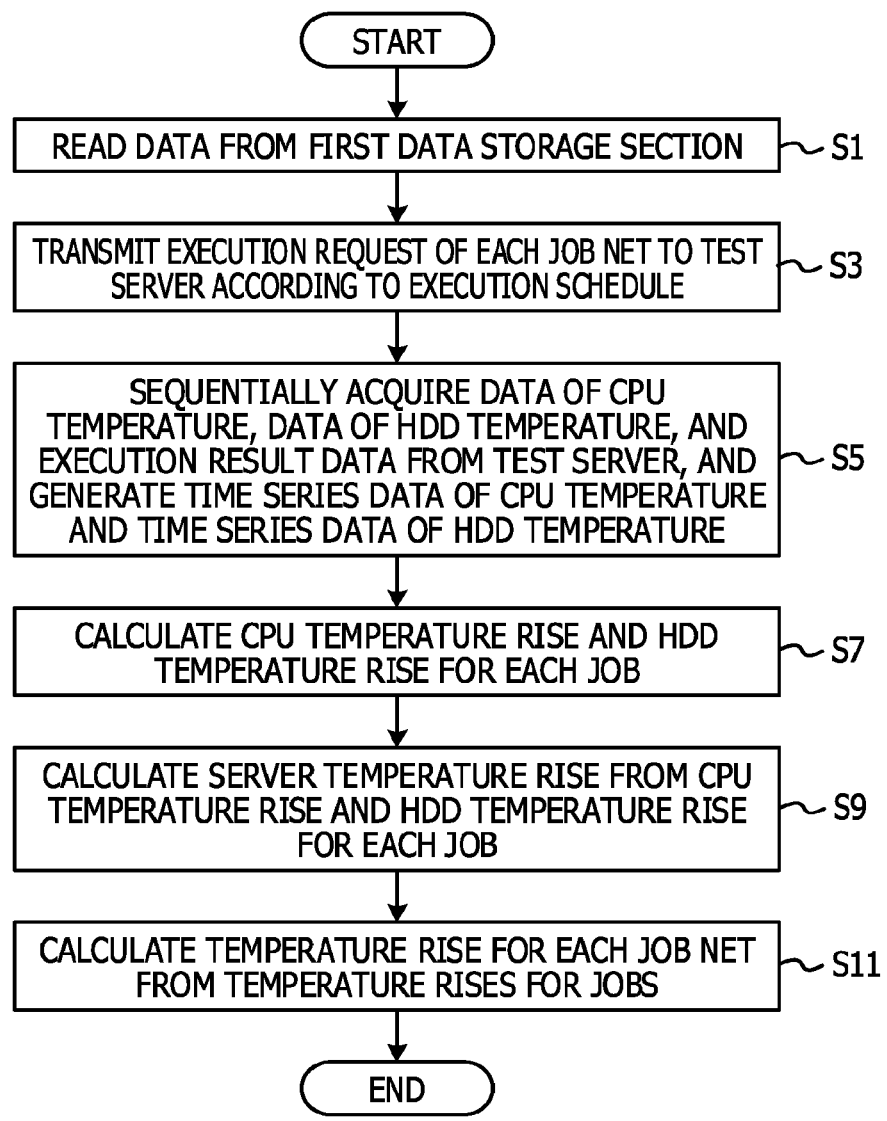
FIG. 6 is a flowchart of a processing executed by a preprocessing section.

The preprocessing section 11 reads an execution schedule for prepositioning and job net data from the first data storage section 14 (FIG. 6: S1).

The preprocessing section 11 transmits an execution request of each of job nets to the test server 3 according to the execution schedule for prepositioning (S3). When the test server 3 does not have a batch file for job execution, the execution request includes a batch file for job execution. Assume that multiple job nets are not executed in parallel in the preprocessing. After a job net has been executed, execution of a next job may be started in a state where temperature of the test server 3 has dropped completely, by securing a sufficient time before the execution.

The test server 3 executes the job net. The temperature sensor 310 and the temperature sensor 330 in the test server 3 measure the CPU temperature and the HDD temperature at regular intervals (for example, every 1 second), and the test server 3 transmits data of measured CPU temperature and HDD temperature to the management device 1. The test server 3 may transmit data of the CPU temperature and data of the HDD temperature in a batch for each of job nets. Also, the test server 3 transmits execution result data including the start time and the end time of each job to the management device 1.

The preprocessing section 11 sequentially acquires data of the CPU temperature, data of the HDD temperature, and execution result data from the test server 3. Then, the preprocessing section 11 generates time series data of the CPU temperature and time series data of the HDD temperature (S5), and stores the time series data of the CPU temperature, the time series data of the HDD temperature, and the execution result data into the second data storage section 15.

FIG. 7A illustrates an example of time series data of the CPU temperature stored in the second data storage section 15. In the example of FIG. 7A, data of the CPU temperature measured every one second is stored.

FIG. 7B illustrates an example of time series data of the HDD temperature stored in the second data storage section 15. In the example of FIG. 7B, data of the HDD temperature measured every one second is stored.

FIG. 8 illustrates an example of execution result data stored in the second data storage section 15. In the example of FIG. 8, the start time and the end time are stored for each job.

Referring back to FIG. 6, the preprocessing section 11 calculates a temperature rise (° C.) of the CPU and a temperature rise (° C.) of the HDD for each job based on time series data of the CPU temperature, time series data of the HDD temperature, and execution result data stored in the second data storage section 15 (S7).

Figure 9:
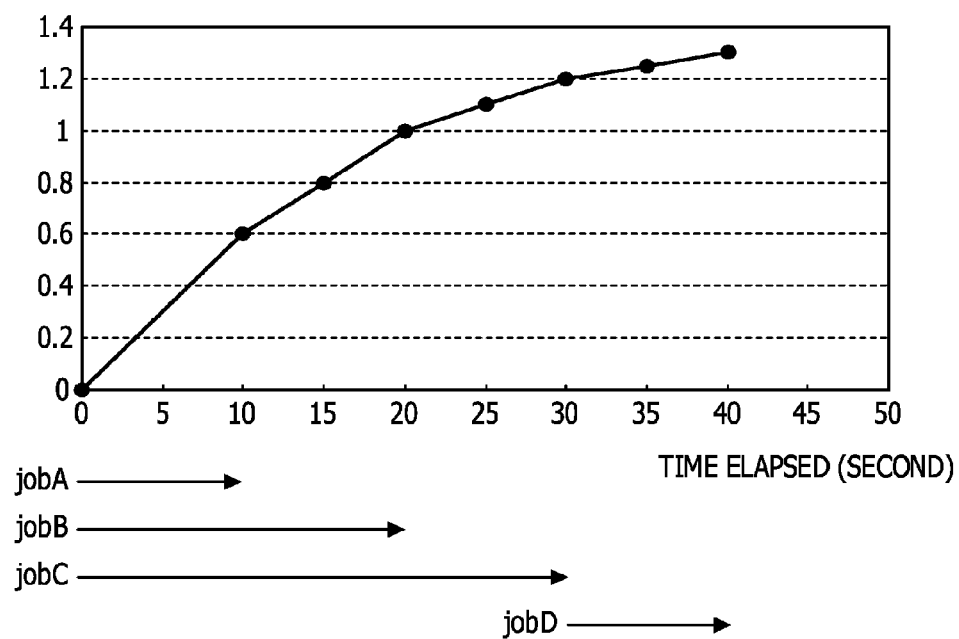
FIG. 9 illustrates a relationship between CPU temperature and time.

Here, a processing of S7 is described. For example, assume that after the start of the execution of a job net (in this case, a job net J), the CPU temperature has risen as illustrated in FIG. 9. In FIG. 9, the longitudinal axis represents the temperature rise of the CPU, and the lateral axis represents the time (in units of seconds) elapsed from the start of the execution of the job net J. In the example of FIG. 9, a job A is executed for 10 seconds after the start of the execution of the job net J, a job B is executed for 20 seconds after the start of the execution of the job net J, a job C is executed for 30 seconds after the start of the execution of the job net J, and a job D is executed for 10 seconds after 30 seconds from the start of the execution of the job net J.

In the example of FIG. 9, since temperature has risen (0.6 to 0.0) for 10 seconds after the start of the execution of the job net J, a formula 1 as illustrated below holds, where, $C_A$ represents the temperature rise of the CPU by the execution of the job A, $C_B$ represents the temperature rise of the CPU by the execution of the job B, $C_C$ represents the temperature rise of the CPU by the execution of the job C, and $C_D$ represents the temperature rise of the CPU by the execution of the job D. Assume that duration of a temperature drop by exhaust heat illustrated in FIG. 9 is negligible.

$$C_A * \left(\frac{10}{10}\right) + C_B * \left(\frac{10}{20}\right) + C_C * \left(\frac{10}{30}\right) = (0.6 - 0.0) \qquad 1$$

Since temperature has risen by (1.0 to 0.6) ° C. for 10 second after elapse of 10 seconds from the start of the execution of the job net J, a formula 2 as illustrated below holds.

$$C_B * \left(\frac{10}{20}\right) + C_C * \left(\frac{10}{30}\right) = (1.0 - 0.6) \qquad 2$$

Since temperature has risen by (1.2 to 1.0) ° C. for 10 seconds after elapse of 20 seconds from the start of the execution of the job net J, a formula 3 as illustrated below holds.

$$C_C * \left(\frac{10}{30}\right) = (1.2 - 1.0) \qquad 3$$

Since temperature has risen by (1.3 to 1.2) ° C. for 10 seconds after elapse of 30 seconds from the start of the execution of the job net J, a formula 4 as illustrated below holds.

$$C_D * \left(\frac{10}{10}\right) = (1.3 - 1.2) \qquad 4$$

By solving the above simultaneous equations, $C_A$, $C_B$, $C_C$, and $C_D$ can be determined. As a result, the preprocessing section 11 generates first CPU data as illustrated in FIG. 10, and stores in the second data storage section 15.

In the example of FIG. 10, the first CPU data includes a job net name, a job name, and a temperature rise (° C.) of the CPU.

Figure 11:
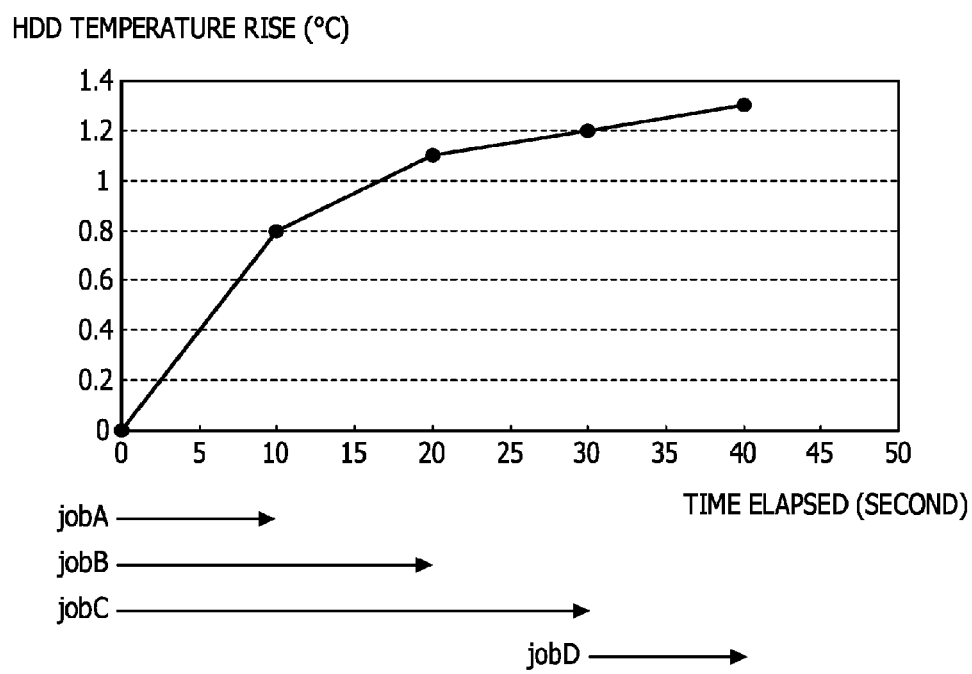
FIG. 11 illustrates a relationship between HDD temperature and time.

Similarly, assume that when the execution of the job net J is started, the HDD temperature has risen as illustrated in FIG. 11. In FIG. 11, the longitudinal axis represents the temperature rise of the HDD, and the lateral axis represents the time (in units of seconds) elapsed from the start of the execution of the job net J.

In the example of FIG. 11, since temperature has risen (0.8 to 0.0) for 10 seconds after the start of the execution of the job net J, a formula 5 as illustrated below holds. $H_A$ represents the temperature rise of the HDD by the execution of the job A, $H_B$ represents the temperature rise of the HDD by the execution of the job B, $H_C$ represents the temperature rise of the HDD by the execution of the job C, and $H_D$ represents the temperature rise of the HDD by the execution of the job D. Assume that duration of a temperature drop by exhaust heat illustrated in FIG. 11 is negligible.

$$H_A * \left(\frac{10}{10}\right) + H_B * \left(\frac{10}{20}\right) + H_C * \left(\frac{10}{30}\right) = (0.8 - 0.0) \qquad 5$$

Since temperature has risen by (1.1 to 0.8) ° C. for 10 second after elapse of 10 seconds from the start of the execution of the job net J, a formula 6 as illustrated below holds.

$$H_B * \left(\frac{10}{20}\right) + H_C * \left(\frac{10}{30}\right) = (1.1 - 0.8) \qquad 6$$

Since temperature has risen by (1.2 to 1.1) ° C. for 10 seconds after elapse of 20 seconds from the start of the execution of the job net J, a formula 7 as illustrated below holds.

$$H_C * \left(\frac{10}{30}\right) = (1.2 - 1.1) \qquad 7$$

Since temperature has risen by (1.3 to 1.2) ° C. for 10 seconds after elapse of 30 seconds from the start of execution of the job net J, a formula 8 as illustrated below holds.

$$H_D * \left(\frac{10}{10}\right) = (1.3 - 1.2) \qquad 8$$

By solving the above simultaneous equations, $H_A$, $H_B$, $H_C$, and $H_D$ can be determined. As a result, the preprocessing section 11 generates first HDD data as illustrated in FIG. 12, and stores in the second data storage section 15. In the example of FIG. 12, the first HDD data includes a job net name, a job name, and a temperature rise (° C.) of the HDD.

Referring back to FIG. 6, the preprocessing section 11 calculates a server temperature rise (° C.) from the CPU temperature rise and the HDD temperature rise for each of jobs based on the first CPU data and the first HDD data (S9). In S9, the preprocessing section 11 calculates the server temperature rise, for example, by S=αC+(1−α)H, where, S is the server temperature rise, C is the CPU temperature rise, and H is the HDD temperature rise. α is a real number satisfying 0<α<1 and predetermined by the administrator as described above. However, the method of calculating the server temperature rise is not limited to the method described herein.

The preprocessing section 11 calculates a temperature rise (° C.) for each of job nets from a temperature rise for each of jobs (S11). As a result of the processings up to S11, the preprocessing section 11 generates first temperature data as illustrated in FIG. 13, and stores in the second data storage section 15. In the example of FIG. 13, the stored first temperature data includes the job net name, the job name, the CPU temperature rise, the HDD temperature rise, the temperature rise by the execution of the job, and the temperature rise by the execution of the job net.

Then, the process ends.

By executing the processings as described above, a temperature rise by the execution of each of job nets can be estimated in advance on a job net basis. Since the job net is executed by one test server 3, variations in the temperature rise due to a difference in performance or installation place of the server may not occur.

Figure 14:
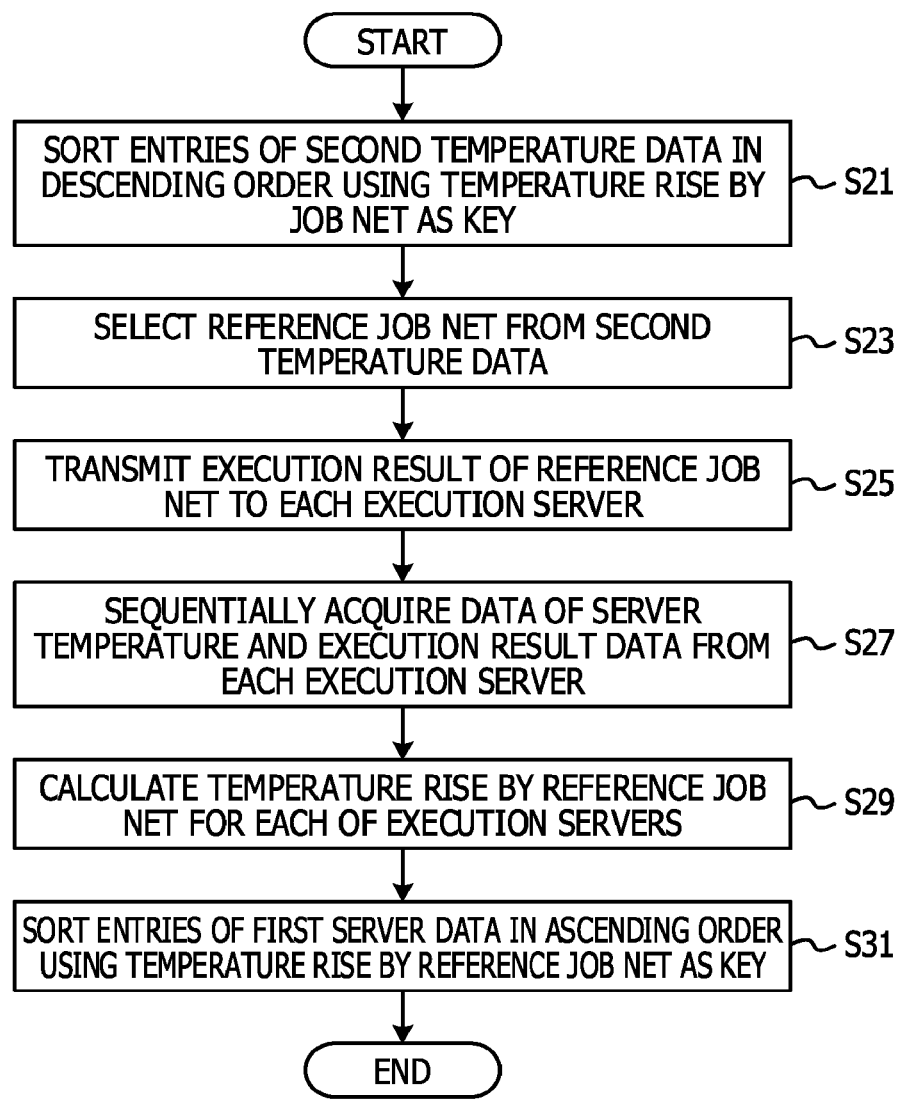
FIG. 14 is a flowchart of a processing executed by a preprocessing section.

Next, a processing of calculating a temperature rise for each of execution servers by the execution of the reference job net by the preprocessing section 11 of the management device 1 is described with reference to FIG. 14 to FIG. 16.

First, the preprocessing section 11 generates second temperature data including the job net name and the temperature rise by the execution of the job net from the first temperature data stored in the second data storage section 15. Then, the preprocessing section 11 sorts entries of the second temperature data in the descending order using the temperature rise by the execution of the job net as a key (FIG. 14: S21).

FIG. 15 illustrates an example of the second temperature data after the processing of S21 has been executed. In the example of FIG. 15, the second temperature data includes the job net name and the temperature rise by the execution of the job net. Then, entries of the second temperature data are sorted by the temperature rise by the execution of the job net.

Referring back to FIG. 14, the preprocessing section 11 selects a reference job net from the second temperature data based on a predetermined condition (S23). As used in the embodiment, the predetermined condition is a condition that the temperature rise by the execution of the job net is highest among the temperature rises. Reason of adopting such a condition is that when a job net causing a small temperature rise due to the reference job net is selected, it may be difficult to confirm a change in the server temperature of the execution server. However, the reference job net may be selected based on other conditions. For example, the reference job net may be selected randomly from job nets having a temperature rise by the execution of a job net higher than a predetermined threshold value. Alternatively, a job net executed longer than a predetermined time duration may be selected based on the execution time as a temperature rise is considered to be relatively high.

The preprocessing section 11 transmits an execution request of the reference job net to each of the execution servers A to P (S25). When the execution servers A to P do not have a batch file for the reference job net, the execution request includes a batch file for the reference job net. In response to the execution request, each of the execution servers A to P executes the reference job net, and sequentially transmits data of the server temperature to the management device 1.

The preprocessing section 11 sequentially acquires data of the server temperature and execution result data from the execution servers A to P (S27), and stores in the second data storage section 15. A format of data of the server temperature stored in the second data storage section 15 is the same as the format illustrated in FIG. 7A and FIG. 7B. The execution result data includes the start time and the end time of the reference job net.

The preprocessing section 11 calculates a temperature rise due to the reference job net for each of the execution servers A to P by calculating, based on data of the server temperature and the execution result data stored in the second data storage section 15, a difference between a server temperature at the execution start time of the reference job net and a server temperature at the execution end time of the reference job net (S29). Then, the preprocessing section 11 generates first server data including an identifier of the execution server and a temperature rise due to the reference job net, and stores in the second data storage section 15.

FIG. 16 illustrates an example of the first server data. In the example of FIG. 16, the first server data includes the identifier of the execution server, and a temperature rise by the execution of the reference job net.

Referring back to FIG. 14, the preprocessing section 11 sorts entries of the first server data in the ascending order using the temperature rise by the execution of the reference job net as a key (S31). Then, the process ends.

Thus, by causing each of execution servers to execute the reference job net, an index representing how easily the temperature rises is acquired.

Next, a processing executed when the execution management section 12 of the management device 1 actually allocates a job to the execution servers A to P is described with reference to FIG. 17 to FIG. 23.

Figure 17:
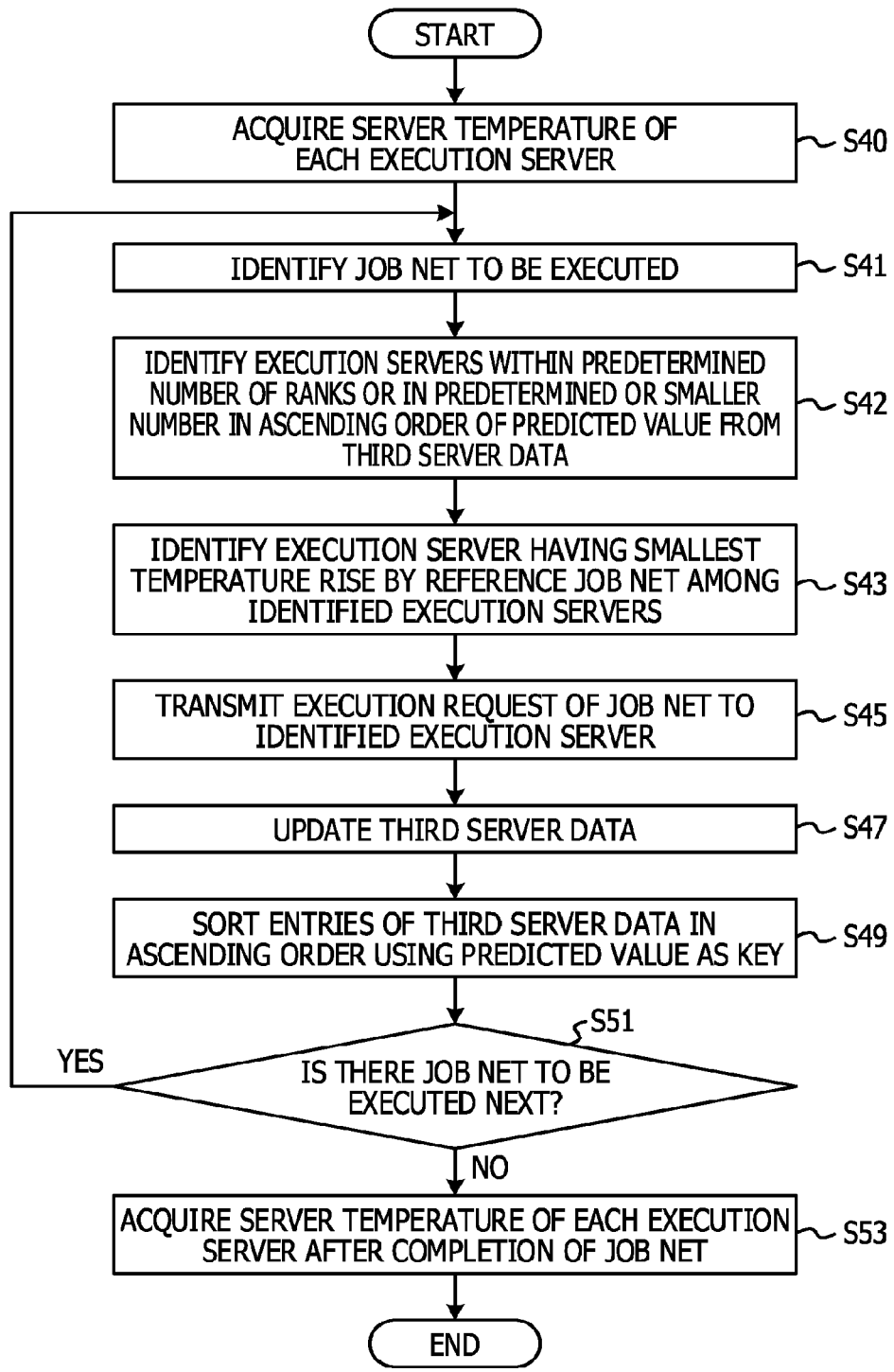
FIG. 17 is a flowchart of a processing executed by an execution management section according to a first embodiment.

First, the execution management section 12 acquires data of the server temperature from the execution servers A to P (FIG. 17: S40), and stores data of the server temperature of the execution servers A to P into the third data storage section 16.

FIG. 18 illustrates an example of data of the server temperature stored in the third data storage section 16. In the example of FIG. 18, data of the server temperature includes name of the execution server and the server temperature thereof.

In this step, the execution management section 12 generates second server data as illustrated in FIG. 19 from the first server data stored in the second data storage section 15 and data of the server temperature stored in the third data storage section 16, and stores in the third data storage section 16. In the example of FIG. 19, the stored second server data includes name of the execution server, the server temperature of the execution server, and a temperature rise by the execution of the reference job net.

Further, the execution management section 12 generates third server data as illustrated in FIG. 20 from the second server data stored in the third data storage section 16, and stores into the third data storage section 16. In the example of FIG. 20, the stored third server data includes name of the execution server, a value of the temperature rise by the execution of the reference job net, and a predicted value of the temperature. At this stage, the predicted value is the same as the server temperature of the execution server. That is, the third server data can be obtained by changing the column name of "server temperature" in the second server data to "predicted value" and moving the position of the column. The execution management section 12 sorts entries of the third server data in the ascending order using the predicted value as a first key, and the temperature rise by the execution of the reference job net as a second key.

Referring back to FIG. 17, the execution management section 12 identifies one job net to be executed, based on an actual execution schedule stored in the first data storage section 14 (S41).

The execution management section 12 identifies execution servers within a predetermined number of ranks or in a predetermined or smaller number in ascending order of the predicted value (S42). Then, the execution management section 12 identifies an execution server having the smallest temperature rise (that is, the temperature is most unlikely to rise) due to the reference job net among the identified execution servers (S43). For example, if the third server data is data as illustrated in FIG. 20, an execution server for an entry on the first row is identified. However, the execution server may be identified by any other way.

If designated data is stored in the fourth data storage section 17, the execution management section 12 may determine in S43 whether the identified execution server satisfies a condition specified in the designated data. The designated data is described later.

The execution management section 12 transmits the execution request of a job net identified in S41 to the execution server identified in S43 (S45). When the execution server does not have a batch file for the job net, the execution request includes a batch file for the job net.

The execution management section 12 updates third server data stored in the third data storage section 16 (S47). Specifically, a temperature rise by the execution of a job net to be executed is added to a server temperature of the execution server identified in S43, as illustrated in FIG. 21. In the example of FIG. 21, the predicted value of the execution server "svD" is updated to 22.0+0.19=22.19 (° C.).

The execution management section 12 sorts entries of the third server data stored in the third data storage section 16 in the ascending order using the predicted value as a first key, and the temperature rise by the execution of the reference job net as a second key (S49). By the processing of S49, the third server data is updated as illustrated in FIG. 22. In the example of FIG. 22, the entry of the execution server "svD" is shifted to the third row.

The execution management section 12 determines whether there is a job net to be executed next, based on an actual execution schedule stored in the first data storage section 14 (S51). If there is a job net to be executed next (route of S51: Yes), the process returns to S41.

If there is no job net to be executed next (route of S51: No), the execution server 12 acquires data of the server temperature from each execution server when the execution of a job net therein ends (S53). Then, the execution management section 12 generates fourth server data as illustrated in FIG. 23 based on server temperatures acquired from each execution server and third server data, and stores into the third data storage section 16.

Then, the process ends.

FIG. 23 illustrates an example of the fourth server data. In the example of FIG. 23, the server name, temperature rise by the execution of the reference job net, predicted value of the temperature, and measured value of the temperature are stored. The field of the measured value stores server temperatures of the execution servers A to P acquired in S53.

By executing such processings, the job is unlikely to be allocated to an execution server whose present temperature is relatively high, or whose temperature is likely to rise. As a result, there is a less likelihood that temperature of an execution server significantly rises compared with temperature of other execution servers. That is, temperatures of the execution servers A to P may be leveled.

Thus, the execution servers A to P can be operated stably in the server room 5, and service life of the execution servers A to P can be prolonged.

Since occurrence of the hot spot can be suppressed, power consumption by the air conditioner 50 can be reduced by lowering the set temperature of the air conditioner 50.

Next, processings executed by the feedback processing section 13 are described with reference to FIG. 24 to FIG. 30.

Figure 24:
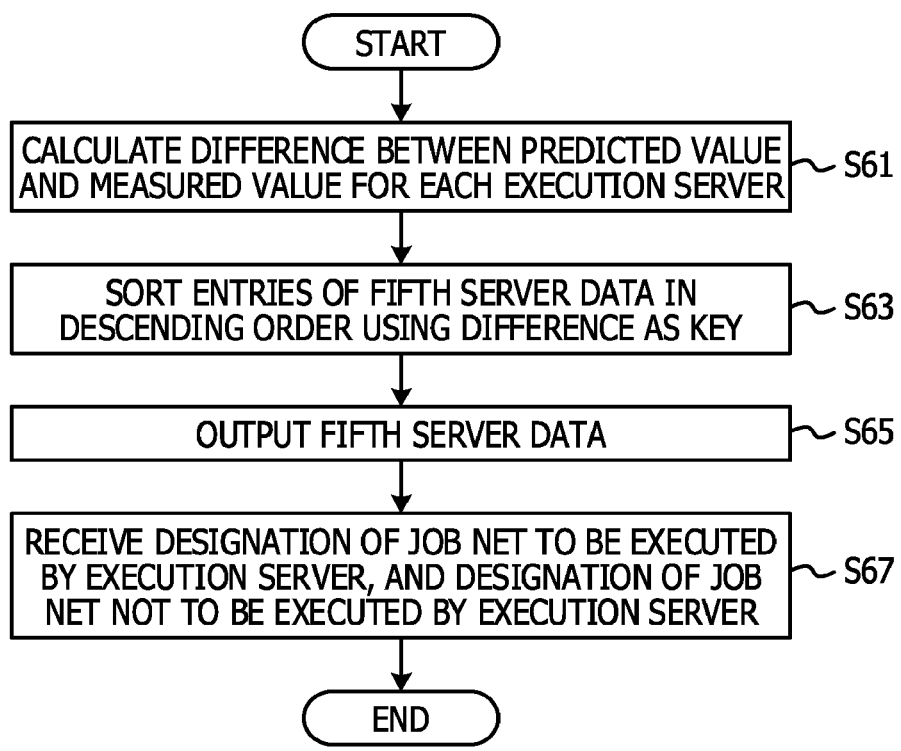
FIG. 24 is a flowchart of a processing executed by a feedback processing section.

First, the feedback processing section 13 calculates the difference between the predicted value and the measured value for each of execution servers based on the fourth server data stored in the third data storage section 16 (FIG. 24: S61). The difference between the predicted value and the measured value is calculated by subtracting the predicted value from the measured value. Then, the feedback processing section 13 generates fifth server data, and stores into the fourth data storage section 17.

FIG. 25 illustrates an example of the fifth server data. In the example of FIG. 25, the execution server name, temperature rise by the execution of the reference job net, predicted value, measured value, and difference between the predicted value and the measured value are stored.

The feedback processing section 13 sorts entries of the fifth server data in the descending order using the difference between the predicted value and the measured value as a key (S63). By sorting entries of the fifth server data illustrated in FIG. 25, for example, data as illustrated in FIG. 26 is obtained.

The feedback processing section 13 outputs fifth server data, for example, to a display device of the management device 1 (S65). From this data, the administrator can easily identify an execution server having a large divergence between the predicted value and the measured value.

The feedback processing section 13 receives, from the administrator, designation of a job net to be executed by the execution server, and designation of a job net not to be executed by the execution server (S67), and generates designated data. Then, the feedback processing section 13 stores the designated data into the fourth data storage section 17.

Then, the process ends.

Figure 27:
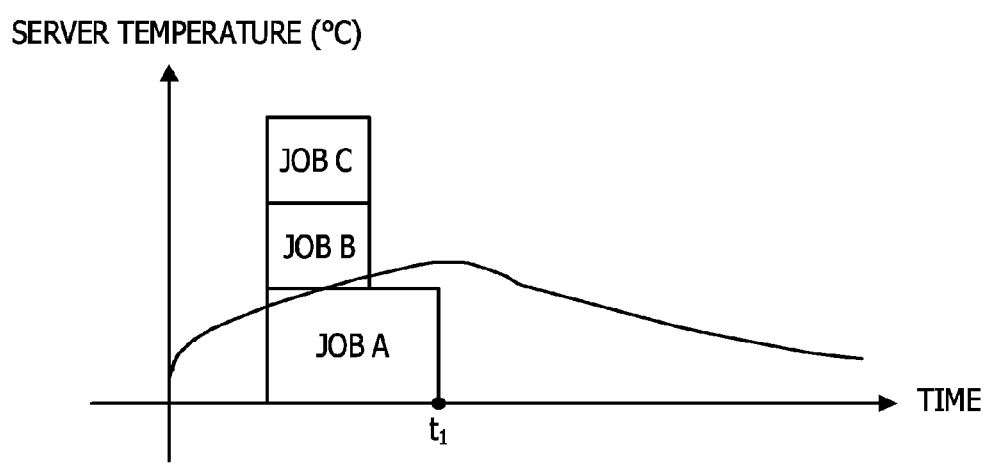
FIG. 27 illustrates a relationship between server temperature and processing load.

One of the reasons why the difference between predicted and measured values of the temperature is large is that execution of a job by an execution server having a high processing load takes a prolonged time period. As an example, execution of a job net including a job A, a job B, and a job C is considered. A change of the server temperature when the execution of each of jobs ends without taking a prolonged time period is illustrated in FIG. 27. In FIG. 27, the longitudinal axis represents the server temperature, the lateral axis represents the time, the rectangular graphic represents the job, a length in the longitudinal axis direction of the rectangular graphic represents the size of the processing load, and a length in the lateral axis direction of the rectangular graphic represents the job processing time. In this example, the processing load of the job A is higher than the processing load of the job B and the processing load of the job C. The server temperature continues rising during execution of the job A and stops rising after the execution of the job A ends. In this embodiment, the measured value is acquired when the execution of the job A has completed. Thus, the measured value is a server temperature at a time $t_1$.

Figure 28:
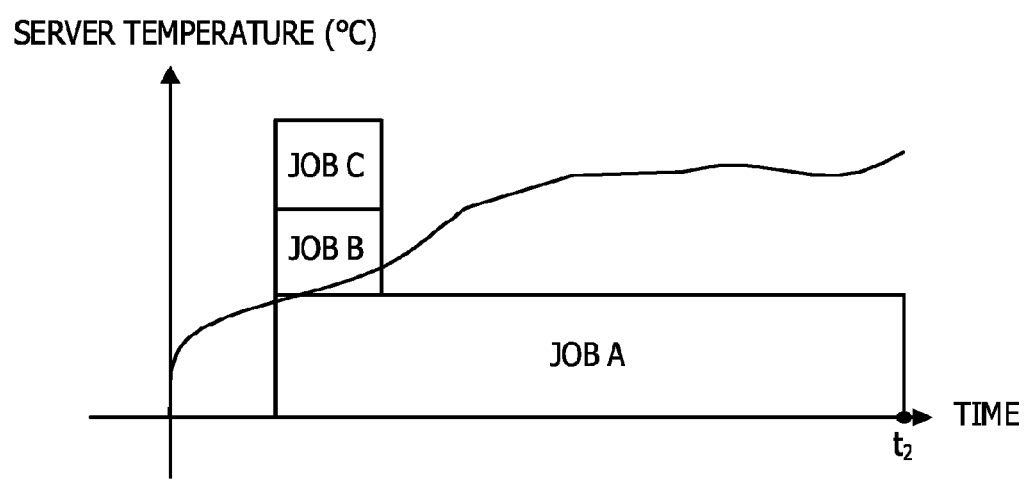
FIG. 28 illustrates a relationship between server temperature and processing load.

Here, an example of the execution of the job A prolonged longer than normal is illustrated in FIG. 28. In the example of FIG. 28, time taken until the execution of the job A completes is longer compared with the example of FIG. 27. Completion time of the job A is a time $t_2$, which is behind the time $t_1$. In such a case, the CPU operation time and the HDD operation time become longer than the example of FIG. 27, causing a rise of the server temperature. Thus, a server temperature at the time $t_2$ becomes higher than a server temperature at the time $t_1$, and this results in increasing the difference between the predicted value and the measured value.

The administrator identifies a job net causing a divergence between the predicted value and the measured value by referring to the outputted execution history of the fifth server data and execution servers, and so on. For example, if an execution server executing a job net (in this case, a job net "netK") including the job A is an execution server "svM" in the example of FIG. 29 the administrator causes an execution server (in this case, an execution server "svN") having a smaller divergence between the predicted value and the measured value than the execution server "svM" to execute the job net "netK". Then, in S67, for example, the administrator designates the job net "netK" as a job net not to be executed by the execution server "svM", and designates the job net "netK" as a job net to be executed by the execution server "svN". Alternatively, the administrator may cause an execution server having a processing performance higher than the execution server "svM" to execute the job net "netK".

FIG. 29 illustrates an example of the designated data. In the example of FIG. 29, name of the execution server, name of the job net to be executed, and name of the job net not to be executed are stored.

By executing the processings described above, the management device 1 can allocate a job based on the designated data from a next time and thereafter. Thus, the server temperatures of the execution servers A to P may be further leveled. For example, the fifth server data as illustrated in FIG. 30 may be obtained. Compared with the example of FIG. 26, the difference between the predicted value and the measured value is reduced, and the measured values of the execution servers A to P are leveled.

Second Embodiment

In the second embodiment, a method of determining the temperature rise more precisely is described.

For example, assume that the CPU temperature has risen by 0.6° C. by executing a job A for 20 seconds. According to the first embodiment, when no other job is executed during the execution of the job A, the temperature rise by the execution of the job A is 0.6° C.

Here, assume that the CPU use rate of the job A is 20% for 10 seconds which are of a first half of 20 seconds, and the CPU use rate of the job A for 10 seconds of the second half is 10%. In such a case, a temperature rise for 10 seconds of the first half and a temperature rise for 10 seconds of the second half are considered to be different. Specifically, the temperature rise for 10 seconds of the first half is 0.6*(20/(20+10))=0.4° C., and the temperature rise for 10 seconds of the second half is 0.6*(10/(20+10))=0.2° C.

By considering the CPU use rate as described above, the CPU temperature rise may be calculated more precisely. Similarly, by considering an input/output (IO) use rate, temperature rise of the HDD may be calculated more precisely.

In the second embodiment, the CPU temperature rise and the HDD temperature rise are calculated by using the CPU use rate and the IO use rate.

Specifically, the preprocessing section 11 acquires data of the CPU use rate and data of the IO use rate in addition to data of the CPU temperature and data of the HDD temperature in S5. Then, the preprocessing section 11 generates time series data of the CPU use rate and time series data of the IO use rate, and stores in the second data storage section 15. The CPU use rate and the IO use rate may be acquired by a function of an operating system (OS) of the test server 3.

FIG. 31 illustrates an example of the time series data of the CPU use rate. In the example of FIG. 31, the job net name and the job name are stored. Data of the CPU use rate measured every 1 second is stored for each job.

FIG. 32 illustrates an example of the time series data of the IO use rate. In the example of FIG. 32, the job net name and the job name are stored. Data, read byte count, and write byte count of the IO use rate measured every 1 second are stored for each job.

Then, in S7, simultaneous equations are generated by further using the CPU use rate. For example, in the example illustrated in FIG. 9, simultaneous equations as illustrated below are generated.

For 10 seconds after the start time, since temperature has risen by (0.6-0.0) ° C., a formula 9 as illustrated below holds. In the formula, $C_A$ represents the temperature rise of the CPU by the execution of the job A, $C_B$ represents the temperature rise of the CPU by the execution of the job B, $C_C$ represents the temperature rise of the CPU by the execution of the job C, and $C_D$ represents the temperature rise of the CPU by the execution of the job D. $U_{X,k}$ represents the CPU use rate of a job X after k seconds from the start of the job X. Assume that the duration of temperature drop by exhaust heat illustrated in FIG. 9 is negligible.

$$C_A * \left(\frac{(U_{A,1} + \ldots + U_{A,10})}{U_{A,1} + \ldots + U_{A,10}}\right) + C_B * \left(\frac{(U_{B,1} + \ldots + U_{B,10})}{U_{B,1} + \ldots + U_{B,20}}\right) + C_C * \left(\frac{(U_{C,1} + \ldots + U_{C,10})}{U_{C,1} + \ldots + U_{C,30}}\right) = (0.6 - 0.0) \quad 9$$

Since temperature has risen by (1.0 to 0.6) ° C. for 10 second after elapse of 10 seconds from the start of the execution of the job net J, a formula 10 as illustrated below holds.

$$C_B * \left(\frac{(U_{B,11} + \ldots + U_{B,20})}{U_{B,1} + \ldots + U_{B,20}}\right) + C_C * \left(\frac{(U_{C,11} + \ldots + U_{C,20})}{U_{C,1} + \ldots + U_{C,30}}\right) = (1.0 - 0.6) \quad 10$$

Since temperature has risen by (1.2 to 1.0) ° C. for 10 seconds after elapse of 20 seconds from the start of the execution of the job net J, a formula 11 as illustrated below holds.

$$C_C * \left(\frac{(U_{C,21} + \ldots + U_{C,30})}{U_{C,1} + \ldots + U_{C,30}}\right) = (1.2 - 1.0) \quad 11$$

Since temperature has risen by (1.3 to 1.2) ° C. for 10 seconds after elapse of 30 seconds from the start of the execution of the job net J, a formula 12 as illustrated below holds.

$$C_D * \left(\frac{(U_{D,1} + \ldots + U_{D,10})}{U_{D,1} + \ldots + U_{D,10}}\right) = (1.3 - 1.2) \quad 12$$

By solving the above simultaneous equations, $C_A$, $C_B$, $C_C$, and $C_D$ can be determined. Description of the HDD temperature rise is omitted since it may be determined by performing similar calculations using data of the IO use rate.

By performing the processings as described above, the CPU temperature rise and the HDD temperature rise may be calculated more precisely.

Third Embodiment

In the third embodiment, the other example of the processing executed by the execution management section 12 is described.

Figure 33:
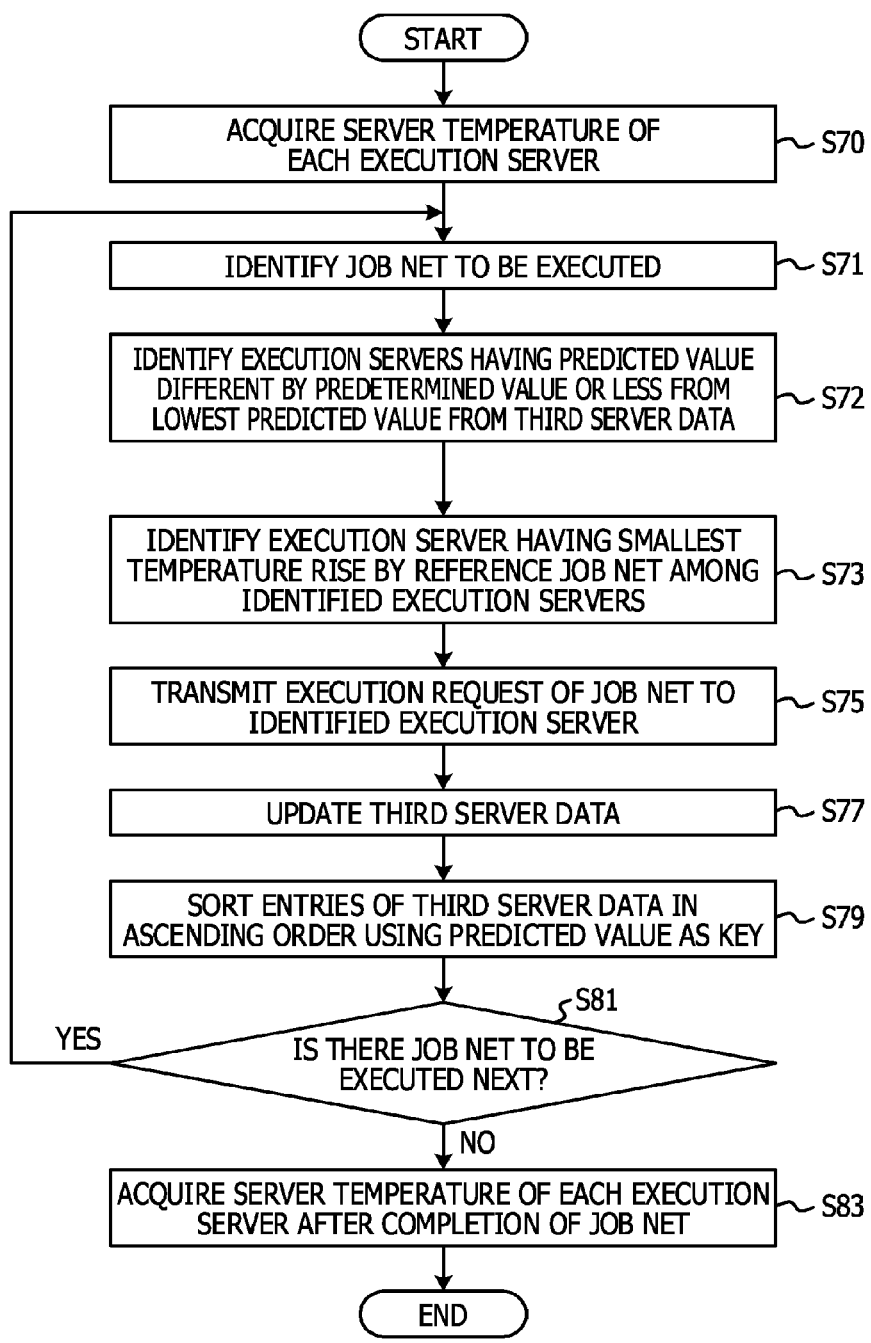
FIG. 33 is a flowchart of a processing executed by an execution management section according to a third embodiment.

First, the execution management section 12 acquires data of the server temperature from the execution servers A to P (FIG. 33: S70), and stores data of the server temperature of the execution servers A to P into the third data storage section 16. This processing is the same as the processing of S40.

The execution management section 12 identifies one job net to be executed, based on an actual execution schedule stored in the first data storage section 14 (S71). This processing is the same as the processing of S41.

From the third server data, the execution management section 12 identifies execution servers each having a predicted value different by a predetermined value or less from the predicted value of the execution server having the lowest predicted value (S72). Then, the execution management section 12 identifies an execution server having the smallest temperature rise among the identified execution servers (S73). Description of subsequent processings is omitted as the processings are the same as the processings in S45 to S53.

Even with the processings described above, the temperatures of the execution servers A to P may be leveled.

Although the embodiments of the present disclosure are described above, the present disclosure is not limited to them. For example, the management device 1 described above may have a functional block configuration different from a modular configuration of an actual program.

Also, the configuration of each table described above is just an example, and is not be limited thereto. Further, also in a processing flow, the sequence of processings may be replaced if there is no change in the processing result. Further, processings may be executed in parallel.

Values stored in each table are just an example, and are not limited thereto. Also, predicted values and measured values illustrated above do not represent actual operation results.

Although the server temperature is used when allocating the job in the embodiment described above, a job execution status (for example, processing load or queue status) may be used in place of the server temperature.

Although temperature drop due to the exhaust heat is not considered when calculating the temperature rise of the CPU and the temperature rise of the HDD in the embodiment described above, the temperature rise of the CPU and the temperature rise of the HDD may be calculated in consideration of temperature drop due to the exhaust heat, for example, by introducing a term of the exhaust heat into the formula.

Figure 34:
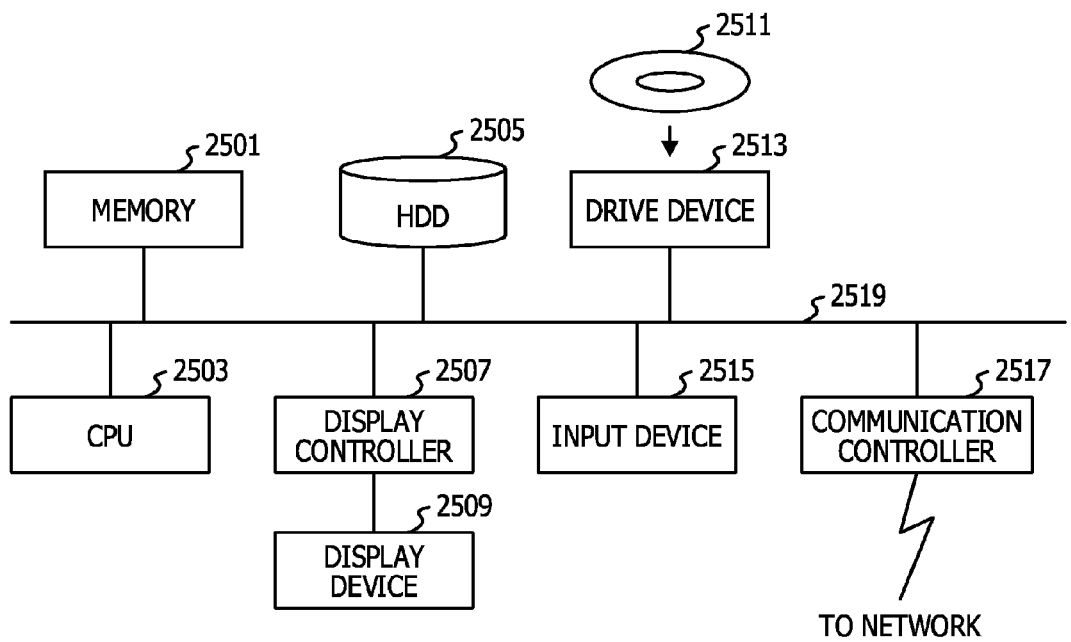
FIG. 34 is a functional block diagram of a computer.

The management device 1 described above is a computer device, which is coupled a memory 2501, a central processing unit (CPU) 2503, a hard disk drive (HDD) 2505, a display controller 2507 coupled to a display device 2509, a drive device 2513 for a removable disk 2511, an input device 2515, and a communication controller 2517 for coupling to a network via a bus 2519, as illustrated in FIG. 34. The operating system (OS) and an application program for performing the processings according to the embodiments are stored in the HDD 2505, and are read from the HDD 2505 to the memory 2501 when executed by the CPU 2503. The CPU 2503 controls the display controller 2507, the communication controller 2517, and the drive device 2513 to cause them to perform the predetermined operations according to the processing contents of the application program. Data being processed is predominantly stored in the memory 2501, but may be stored in the HDD 2505. In the embodiments of the present disclosure, the application program for performing the processings described above is stored in the computer readable removable disk 2511, is distributed, and is installed on the HDD 2505 from the drive device 2513. Instead, the application program may be installed on the HDD 2505 via a network such as the internet and the communication controller 2517. Such computer devices achieve the various functions as described above by organic collaboration among the hardware such as the CPU 2503 and the memory 2501, the OS, and the program such as the application, as described above.

The embodiments of the present disclosure described above are summarized below.

A method of allocating a job according to the embodiments comprises: (A) generating information of a first change amount for each of a plurality of jobs based on temperature information of a first information processing device that have executed the plurality of jobs, the first change amount being an amount of temperature changed when each job is executed, the temperature information acquired from the first information processing device; (B) generating information of a second change amount for each of a plurality of second information processing devices that has executed a specific one of the plurality of jobs, based on temperature information of the each second information processing device acquired from the each second information processing device, the second change amount being an amount of temperature changed when the specific job is executed; and (C) determining which one of the plurality of second information processing devices each of the plurality of jobs is to allocated to, based on the temperature information of the plurality of second information processing devices, the information of the first change amounts for the plurality of jobs, and information of the second change amounts for the plurality of second information processing devices.

The second change amount generated as described above indicates how easily the temperature of the second information processing device changes. This provides a countermeasure of avoiding job allocation to a second information processing device in which the temperature tends to change. Therefore, the jobs may be allocated appropriately based on the temperatures.

In the above step of determining which one of the plurality of second information processing devices each of the plurality of jobs is to allocated to, (c1) for each of the plurality of jobs, second information processing devices within a predetermined number of ranks or in a predetermined or smaller number in ascending order of the temperature of the second information processing device may be identified among the plurality of second information processing devices; and a second information processing device to which the job is to be allocated may be determined based on the second change amounts among the identified second information processing devices. In this way, jobs may be allocated such that the temperatures of the plurality of second information processing devices can be leveled.

In the above step of determining which one of the plurality of second information processing devices each of the plurality of jobs is to allocated to, (c2) for each of the plurality of jobs, second information processing devices each having a temperature different by a predetermined value or less from a temperature of a second information processing device that has the lowest temperature may be identified among the plurality of second information processing devices; and a second information processing device to which the job is to be allocated may be determined based on the second change amounts among the identified second information processing devices. In this way, jobs may be allocated such that the temperatures of the plurality of second information processing devices are leveled.

The job allocation method may further include (D) a step of, for each of the plurality of jobs, updating the temperature information of the second information processing device to which the job is to be allocated, such that the temperature information indicates a value obtained by adding the first change amount for the job to the temperature of the second information processing device to which the job is to be allocated. In this way, a job allocation may be performed in consideration of temperature changes due to already allocated jobs.

The job allocation method may further include a step of acquiring information of a start time and an end time for each of the plurality of jobs from the first information processing device. In the above step of generating a first change amount for each of the plurality of jobs, (a1) the first change amount may be generated for each of the plurality of jobs by calculating a difference between a temperature of the first information processing device at the start time of the job and a temperature of the first information processing device at the end time of the job. Thus, the information of the first change amount may be generated appropriately.

The temperature information of the first information processing device may be information generated based on temperature information of a processor in the first information processing device and temperature information of a storage device in the first information processing device. Since the temperatures of the processor and the storage device change particularly when a job is executed, the temperature information may be generated more appropriately by using the above method.

The job allocation method may further include (E) a step of acquiring information of a use rate of a processor and information of IO use rates for a storage device from the first information processing device. In the above step of generating the information of the first change amount for each of the plurality of jobs, (a2) the information of the first change amount which is an amount of temperature changed when a job is executed may be generated for each of the plurality of jobs based on the temperature information of the first information processing device, the information of the use rate of the processor, and the information of the input and output use rates for a storage device. Thus, information of the first change amount may be generated more precisely.

The job allocation method may further include (F) a step of acquiring the temperature information of the second information processing devices from the plurality of second information processing devices, when execution of the plurality of jobs completes; and (G) generating information of a difference between the temperature in the acquired temperature information for each of the plurality of second information processing devices, and the temperature in the updated temperature information of the second information processing device; and outputting the generated information of the difference. Thus, the difference between the calculated temperature and the actual temperature may be checked by an administrator or the like.

A program for causing a computer to execute the above processings may be created, and the program may be stored, for example, in a computer readable storage medium or storage device such as a flexible disk, an optical disk such as CD-ROM, an optical magnetic disk, a semiconductor memory (for example, ROM), and a hard disk. Intermediate processing results may be temporarily stored in a storage device such as a memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method comprising:
generating first information for each of a plurality of jobs based on temperature information acquired from a first information processing device that has executed each of the plurality of jobs, each of the first information indicating change amount of the temperature of the first information processing device when each corresponding job is executed by the first information processing device;
generating second information for each of a plurality of second information processing devices that have executed a specific one of the plurality of jobs, based on temperature information acquired from each of the second information processing devices, the second information indicating change amount of the temperature of each of the second information processing devices when the specific job is executed by each of the second information processing devices;
determining which one of the plurality of second information processing devices to allocate at least one of the plurality of jobs, based on the temperature information of the plurality of second information processing devices, the first information for the plurality of jobs, and the second information for the plurality of second information processing devices; and
allocating the at least one of the plurality of jobs to the determined one of the plurality of second information processing devices.

2. The method according to claim 1, wherein the determining comprises:
for the at least one of the plurality of jobs, identifying second information processing devices within a predetermined number of the temperature of the plurality of second information processing devices in ascending order; and
determining one of the identified second information processing devices to which the job is to be allocated, based on the second information for the identified second information processing devices.

3. The method according to claim 1, wherein the determining comprises:
for the at least one of the plurality of jobs, identifying second information processing devices each having a temperature different by a predetermined value or less from a temperature of a second information processing device that has the lowest temperature among the plurality of second information processing devices; and
determining a second information processing device to which the job is to be allocated, among the identified second information processing devices based on the second information for the identified second information processing devices.

4. The method according to claim 2, further comprising:
for a job among the at least one of the plurality of jobs, updating the temperature information of the second information processing device to which the job is to be allocated, by adding the first information for the job to the temperature of the second information processing device to which the job is to be allocated.

5. The method according to claim 1, further comprising:
acquiring information of a start time and an end time for each of the plurality of jobs from the first information processing device,
wherein the generating of the first information includes generating the first information for each of the plurality of jobs by calculating a difference between a temperature of the first information processing device at the start time of the job, and a temperature of the first information processing device at the end time of the job.

6. The method according to claim 1, wherein the temperature information of the first information processing device is generated based on temperature information of a processor in the first information processing device and temperature information of a storage device in the first information processing device.

7. The method according to claim 6, further comprising:
acquiring information of a usage rate of the processor and information of input and output usage rates for the storage device,
wherein the generating of the first information includes generating the first information for each of the plurality of jobs based on the temperature information of the first information processing device, the information of the usage rate of the processor, and the information of the input and output usage rates for the storage device.

8. The method according to claim 4, further comprising:
acquiring the temperature information from the plurality of second information processing devices, when execution of the at least one of the plurality of jobs completes;
generating information of a difference between the temperature in the acquired temperature information for each of the plurality of second information processing devices, and the temperature in the updated temperature information of the second information processing devices; and
outputting the generated information of the difference.

9. A non-transitory computer readable medium having stored therein a program that causes a computer to execute a process, the process comprising:
generating first information for each of a plurality of jobs based on temperature information acquired from a first information processing device that has executed each of the plurality of jobs, each of the first information indicating change amount of the temperature of the first information processing device when each corresponding job is executed by the first information processing device;
generating second information for each of a plurality of second information processing devices that have executed a specific one of the plurality of jobs, based on temperature information acquired from each of the second information processing devices, the second information indicating change amount of the temperature of each of the second information processing devices when the specific job is executed by each of the second information processing devices;
determining which one of the plurality of second information processing devices to allocate at least one of the plurality of jobs, based on the temperature information of the plurality of second information processing devices, the first information for the plurality of jobs, and the second information for the plurality of second information processing devices; and allocating the at least one of the plurality of jobs to the determined one of the plurality of second information processing devices.

10. The non-transitory computer readable medium according to claim 9, wherein the determining comprises:

for the at least one of the plurality of jobs, identifying second information processing devices within a predetermined number of the temperature of the plurality of second information processing devices in ascending order; and determining one of the identified second information processing devices to which the job is to be allocated, based on the second information for the identified second information processing devices.

11. The non-transitory computer readable medium according to claim 9, wherein the determining comprises:

for the at least one of the plurality of jobs, identifying second information processing devices each having a temperature different by a predetermined value or less from a temperature of a second information processing device that has the lowest temperature among the plurality of second information processing devices; and determining a second information processing device to which the job is to be allocated, among the identified second information processing devices based on the second information for the identified second information processing devices.

12. The non-transitory computer readable medium according to claim 10, wherein the process further comprising:

for a job among the at least one of the plurality of jobs, updating the temperature information of the second information processing device to which the job is to be allocated, by adding the first information for the job to the temperature of the second information processing device to which the job is to be allocated.

13. The non-transitory computer readable medium according to claim 9, wherein the process further comprising:

acquiring information of a start time and an end time for each of the plurality of jobs from the first information processing device, wherein the generating of the first information includes generating the first information for each of the plurality of jobs by calculating a difference between a temperature of the first information processing device at the start time of the job, and a temperature of the first information processing device at the end time of the job.

14. The non-transitory computer readable medium according to claim 9, wherein the temperature information of the first information processing device is generated based on temperature information of a processor in the first information processing device and temperature information of a storage device in the first information processing device.

15. The non-transitory computer readable medium according to claim 14, wherein the process further comprising:

acquiring information of a usage rate of the processor and information of input and output usage rates for the storage device, wherein the generating of the first information includes generating the first information for each of the plurality of jobs based on the temperature information of the first information processing device, the information of the usage rate of the processor, and the information of the input and output usage rates for the storage device.

16. The non-transitory computer readable medium according to claim 12, wherein the process further comprising:

acquiring the temperature information from the plurality of second information processing devices, when execution of the at least one of the plurality of jobs completes;

generating information of a difference between the temperature in the acquired temperature information for each of the plurality of second information processing devices, and the temperature in the updated temperature information of the second information processing devices; and outputting the generated information of the difference.

17. A system comprising:

processing circuitry configured to generate first information for each of a plurality of jobs based on temperature information acquired from a first information processing device that has executed each of the plurality of jobs, each of the first information indicating change amount of the temperature of the first information processing device when each corresponding job is executed by the first information processing device;

generate second information for each of a plurality of second information processing devices that have executed a specific one of the plurality of jobs, based on temperature information acquired from each of the second information processing devices, the second information indicating change amount of the temperature of each of the second information processing devices when the specific job is executed by each of the second information processing devices;

determine which one of the plurality of second information processing devices to allocate at least one of the plurality of jobs, based on the temperature information of the plurality of second information processing devices, the first information for the plurality of jobs, and the second information for the plurality of second information processing devices; and allocate the at least one of the plurality of jobs to the determined one of the plurality of second information processing devices.

18. The system according to claim 17, wherein the processing circuitry is further configured to identify, for the at least one of the plurality of jobs, second information processing devices within a predetermined number of the temperature of the plurality of second information processing devices in ascending order; and determine one of the identified second information processing devices to which the job is to be allocated, based on the second information for the identified second information processing devices.

19. The system according to claim 17, wherein the processing circuitry is further configured to identify, for the at least one of the plurality of jobs, second information processing devices each having a temperature different by a predetermined value or less from a temperature of a second information processing device that has the lowest temperature among the plurality of second information processing devices; and determine a second information processing device to which the job is to be allocated, among the identified second information processing devices based on the second information for the identified second information processing devices.

20. The system according to claim 17, further comprising:
the first information processing device; and
the plurality of second information processing devices.

* * * * *